(12) United States Patent
Risberg et al.

(10) Patent No.: US 7,516,129 B2
(45) Date of Patent: Apr. 7, 2009

(54) METHOD OF INDEXING DIGITIZED ENTITIES IN A DATA COLLECTION TO FACILITATE SEARCHING

(75) Inventors: Robert Risberg, Hägersten (SE); Nils Andersson, Stockholm (SE)

(73) Assignee: picsearch AB, Stockholm (SE)

( * ) Notice: Subject to any disclaimer, the term of this patent is extended or adjusted under 35 U.S.C. 154(b) by 258 days.

(21) Appl. No.: 10/471,105

(22) PCT Filed: Mar. 13, 2002

(86) PCT No.: PCT/SE02/00452

§ 371 (c)(1),
(2), (4) Date: Sep. 5, 2003

(87) PCT Pub. No.: WO02/073463

PCT Pub. Date: Sep. 19, 2002

(65) Prior Publication Data

US 2004/0098399 A1    May 20, 2004

(30) Foreign Application Priority Data

Mar. 13, 2001    (SE)    .................................... 0100856

(51) Int. Cl.
*G06F 7/00*    (2006.01)
*G06F 17/30*    (2006.01)
(52) U.S. Cl. ........................ 707/5; 707/1; 707/3; 707/4
(58) Field of Classification Search ........................ None
See application file for complete search history.

(56) References Cited

U.S. PATENT DOCUMENTS 5,638,465 A * 6/1997 Sano et al. ................... 382/281

(Continued)

FOREIGN PATENT DOCUMENTS

EP    0 596 247    5/1994

(Continued)

OTHER PUBLICATIONS

Lu et al., "A Unified Framework for Semantics and Feature Based Relevance Feedback in Image Retrieval Systems", Proceedings of the Eighth ACM International Conference on Multimedia, pp. 31-37, 2000, ACM.*

(Continued)

*Primary Examiner*—Christian P. Chace
*Assistant Examiner*—Michael J Hicks
(74) *Attorney, Agent, or Firm*—Alston & Bird LLP

(57) ABSTRACT

The invention relates to indexing of digitized entities in a large and comparatively unstructured data collection, for instance the Internet, such that text-based searches with respect to the data collection can be ordered via a user client terminal. Index information is generated for each digitized entity, which contains distinctive features being ranked according to a rank parameter. The rank parameter indicates a degree of relevance of particular distinctive feature with respect to a given digitized entity and is derived from fields or tags associated with one or more copies of the digitized entity in the data collection. The index information is stored in a searchable database, which is accessible via a user client interface and a search engine. The derived distinctive features and the rank parameter thus provides a possibility to carry out text-based searches in respect of non-text digitized entities, such as images, audio files and video sequences and obtain a highly relevant search result.

9 Claims, 3 Drawing Sheets

U.S. PATENT DOCUMENTS

| | | | | |
|---|---|---|---|---|
| 6,084,595 A * | 7/2000 | Bach et al. | ............... | 345/589 |
| 6,167,397 A * | 12/2000 | Jacobson et al. | ............... | 707/5 |
| 6,182,063 B1 * | 1/2001 | Woods | ............... | 707/3 |
| 6,317,740 B1 * | 11/2001 | Mukherjea et al. | ............... | 707/4 |
| 6,718,365 B1 * | 4/2004 | Dutta | ............... | 709/203 |
| 6,970,860 B1 * | 11/2005 | Liu et al. | ............... | 707/3 |
| 7,099,860 B1 * | 8/2006 | Liu et al. | ............... | 707/3 |

FOREIGN PATENT DOCUMENTS

| | | |
|---|---|---|
| WO | WO/99/22318 | 5/1999 |
| WO | WO/00/33575 | 6/2000 |

OTHER PUBLICATIONS

International Search Report for PCT/SE02/00462 completed Jun. 19, 2002.

* cited by examiner

| E | K | R | L |
|---|---|---|---|
| $ID_1$ | $\Delta(k_2), \Delta(k_5), \Delta(k_6)$ | $r_1$ | $l_1$ |
| $ID_2$ | $\Delta(k_1), \Delta(k_{23})$ | $r_2$ | $l_2$ |
| ⋮ | ⋮ | ⋮ | ⋮ |
| $ID_n$ | $\Delta(k_3), \Delta(k_5), \Delta(k_{19})$ | $r_n$ | $l_n$ |
| ⋮ | ⋮ | ⋮ | ⋮ |
| $ID_m$ | $\Delta(k_5), \Delta(k_{12})$ | $r_m$ | $l_m$ |

METHOD OF INDEXING DIGITIZED ENTITIES IN A DATA COLLECTION TO FACILITATE SEARCHING

BACKGROUND OF THE INVENTION

1) Field of the Invention

The present invention relates generally to indexing of digitized entities in a large and comparatively unstructured data collection such that a relevant search result can be obtained. More particularly the invention relates to a method of indexing digitized entities, such as images, video or audio files. The invention also relates to a computer program, a computer readable medium, a database and a server/client system for indexing digitized entities.

2) Description of Related Art

Search engines and index databases for automatically finding information in digitized text banks have been known for decades. In recent years the rapid growth of the Internet has intensified the development in this area. Consequently, there are today many examples of very competent tools for finding text information in large and comparatively unstructured data collections or networks, such as the Internet.

As the use of the Internet has spread to a widened group of users, the content of web pages and other resources has diversified to include not only text, but also other types of digitized entities, like graphs, images, video sequences, audio sequences and various other types of graphical or acoustic files. An exceptionally wide range of data formats may represent these files. However, they all have one feature in common, namely that they per se lack text information. Naturally, this fact renders a text search for the information difficult. Various attempts to solve this problem have nevertheless already been made.

For instance, the U.S. Pat. No. 6,084,595 describes an indexing method for generating a searchable database from images, such that an image search engine can find content based information in images, which match a user's search query. Feature vectors are extracted from visual data in the images. Primitives, such as color, texture and shape constitute parameters that can be distilled from the images. A feature vector is based on at least one such primitive. The feature vectors associated with the images are then stored in a feature database. When a query is submitted to the search engine, a query feature vector will be specified, as well as a distance threshold indicating the maximum distance that is of interest for the query. All images having feature vectors within that distance will be identified by the query. Additional information is computed from the feature vector being associated with each image, which can be used as a search index.

An alternative image and search retrieval system is disclosed in the international patent application WO99/22318. The system includes a search engine, which is coupled to an image analyzer that in turn has access to a storage device. Feature modules define particular regions of an image and measurements to make on pixels within the defined region as well as any neighboring regions. The feature modules thus specify parameters and characteristics which are important in a particular image match/search routine. As a result, a relatively rapid comparison of images is made possible.

The international patent application WO00/33575 describes a search engine for video and graphics. The document proposes the creation and storage of identifiers by searching an area within a web page near a graphic file or a video file for searchable identification terms. Areas on web pages near links to graphic or video files are also searched for such identification terms. The identification terms found are then stored in a database with references to the corresponding graphic and video files. A user can find graphic or video files by performing a search in the database.

However, the search result will, in general, still not be of sufficiently high quality, because the identification terms are not accurate enough. Hence, relevant files may either end up comparatively far down in the hit list or be missed completely in the search.

BRIEF SUMMARY OF THE INVENTION

It is therefore an object of the present invention to alleviate the problem above and thus provide an improved solution for finding relevant digitized entities, such as images, video files or audio files, by means of an automatic search being performed with respect to a large and relatively unstructured data collection, such as the Internet.

According to one aspect of the invention the object is achieved by a method of indexing digitized entities as initially described, which is characterized by generating index information for a particular digitized entity on basis of at least one rank parameter. The rank parameter is derived from basic information, which in turn pertains to at least one distinctive feature and at least one locator for each of the digitized entities. The rank parameter indicates a degree of relevance for at least one distinctive feature with respect to each digitized entity.

According to another aspect of the invention these objects are achieved by a computer program directly loadable into the internal memory of a digital computer, comprising software for controlling the method described in the above paragraph when said program is run on a computer.

According to yet another aspect of the invention these objects are achieved by a computer readable medium, having a program recorded thereon, where the program is to make a computer perform the method described in the penultimate paragraph above.

According to an additional aspect of the invention the object is achieved by a database for storing index information relating to digitized entities, which have been generated according to the proposed method.

According to yet an additional aspect of the invention the object is achieved by a server/client system for searching for digitized entities in a data collection as initially described, which is characterized in that an index database in the server/client system is organized, such that index information contained therein, for a particular digitized entity comprises at least one rank parameter. The rank parameter is indicative of a degree of relevance for at least one distinctive feature with respect to the digitized entity.

The invention provides an efficient tool for finding highly relevant non-text material on the Internet by means of a search query formulated in textual terms. An advantage offered by the invention is that the web pages, or corresponding resources, where the material is located need not contain any text information to generate a hit.

This is an especially desired feature, in comparison to the known solutions, since in many cases the non-text material may be accompanied by rather laconic, but counter intuitive text portions.

A particular signature for each unique digitized entity utilized in the solution according to the invention makes it possible eliminate any duplicate copies of digitized entities in a hit list obtained by a search. Naturally, this further enhances the search quality.

BRIEF DESCRIPTION OF THE DRAWINGS

The present invention is now to be explained more closely by means of preferred embodiments, which are disclosed as examples, and with reference to the attached drawings.

DETAILED DESCRIPTION OF THE INVENTION

The invention aims at enhancing the relevancy of any distinctive features, for instance keywords, being related to digitized entities and thereby improving the chances of finding relevant entities in future searches. In order to achieve this objective, at least one rank parameter is allocated to each distinctive feature that is related to a digitized entity. The embodiment of the invention described below refers to digitized entities in the form of images. However, the digitized entities may equally well include other types of entities that are possible to identify uniquely, such as audio files or video sequences. Moreover, the digitized entities may either constitute sampled representations of analog signals or be purely computer-generated entities.

Figure 1:
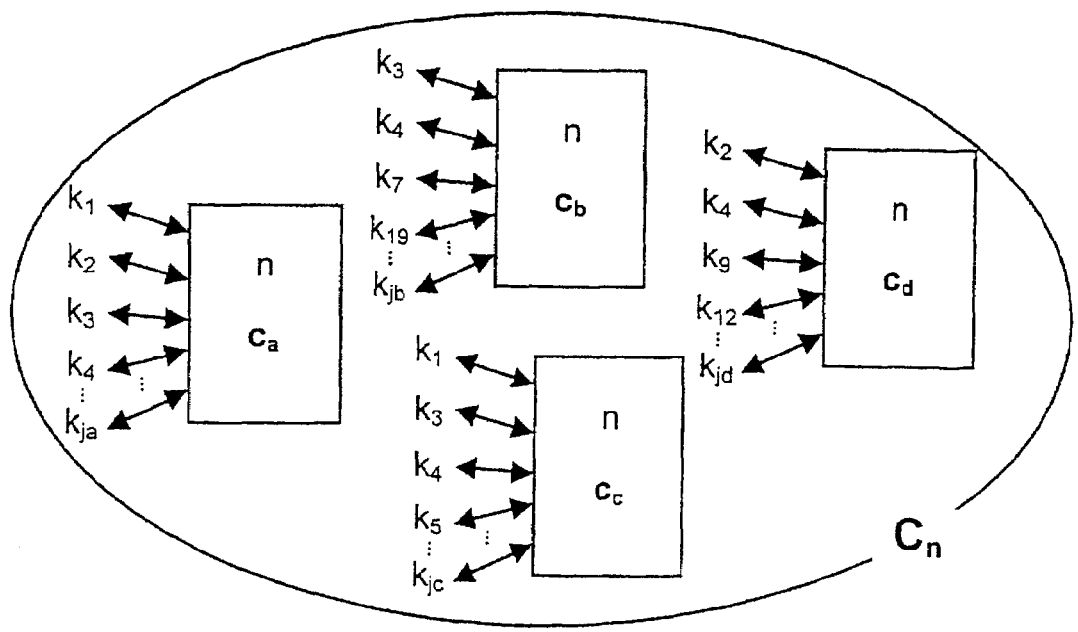
FIG. 1 illustrates the generation of a first rank component in a proposed rank parameter according to an embodiment of the invention.

FIG. 1 shows four copies $c_a$-$c_d$ of one and the same image n that are stored at different locations in a data collection, for instance in an internetwork, like the Internet. The identity of the image n can be assessed by means of a so-called image signature, which may be determined from a total sum of all pixel values contained in the image. A corresponding identity may, of course, be assessed also for an audio file or a video file.

The copies $c_a$-$c_d$ of the image n are logically grouped together in a cluster $C_n$. Each copy $c_a$-$c_d$ is presumed to be associated with at least one distinctive feature in the form of a keyword. Typically, the keywords are data that are not necessarily being shown jointly with the image. On the contrary, the keywords may be collected from data fields which are normally hidden to a visitor of a certain web page. Thus, the keywords may be taken from HTML-tags such as Meta, 1 mg or Title (HTML=HyperText Mark-up Language).

In this example a first copy $c_a$ of the image n is associated with the keywords $k_1$, $k_2$, $k_3$, $k_4$ up to $k_{ja}$, a second copy $c_b$ is associated with the keywords $k_3$, $k_4$, $k_7$, $k_{19}$ up to $k_{jb}$, a third copy $c_c$ is associated with the keywords $k_1$, $k_3$, $k_4$, $k_5$ up to $k_{jc}$, and a fourth copy $c_d$ is associated with the keywords $k_2$, $k_4$, $k_9$, $k_{12}$ up to $k_{jd}$. In order to determine the relevance of a particular keyword, say $k_3$, with respect to the image n a first rank component $\Gamma_n(k_3)$ is calculated according to the expression:

$$\Gamma_n(k_3) = \frac{\sum_i k_{i,3}}{|C_n|} \text{ where } \sum_i k_{i,3}$$

represents a sum of all occurrences of the keyword $k_3$ in the cluster $C_n$ and $|C_n|$ denotes a total number of keywords in the cluster $C_n$, i.e. the sum of unique keywords plus any copies of the same.

Figure 2:
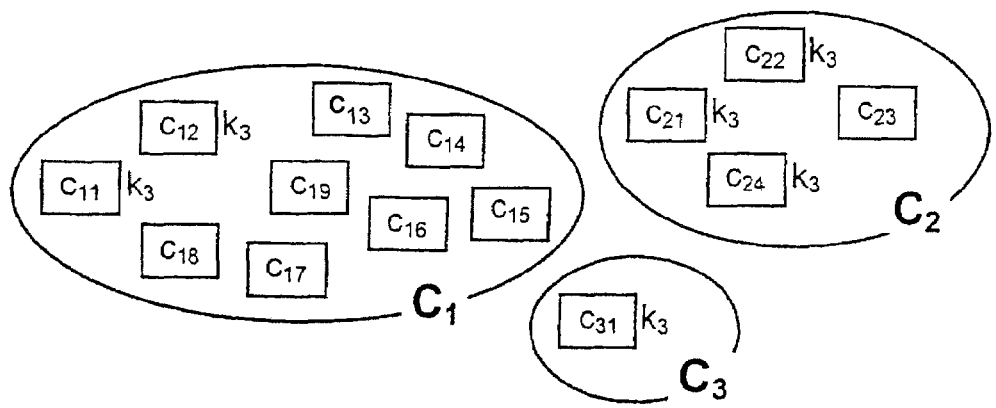
FIG. 2 illustrates an enhancement of the first rank component according to an embodiment of the invention.

However, it is also quite common that a particular keyword, for instance $k_3$, is associated with many different images. This is illustrated in FIG. 2. Here, a first cluster $C_1$ contains nine copies $c_{11}$-$c_{19}$ of a first image $n_1$, a second cluster $C_2$ contains four copies $c_{21}$-$c_{24}$ of a second image $n_2$ and a third cluster $C_3$ contains one copy $c_{31}$ of a third image $n_3$. The keyword $k_3$ occurs twice (affiliated with $c_{11}$ and $c_{12}$) in the first cluster $C_1$, three times (affiliated with $c_{21}$, $c_{22}$ and $c_{24}$) in the second cluster $C_2$ and once (affiliated with $c_{31}$) in the third cluster $C_3$.

The first rank component $\Gamma$ for the keyword $k_3$ may now be improved by means of a figure reflecting the strength in linkage between the keyword $k_3$ and the images $n_1$-$n_3$ (or clusters $C_1$-$C_3$) to which it has been associated. The keyword $k_3$ appears to have its strongest link to the second image $n_2$, since it is associated with the largest number of copies of this image, namely $c_{21}$, $c_{22}$ and $c_{24}$. Correspondingly, the keyword $k_3$ has a second strongest link to the first image $n_1$ (where it occurs in two out of nine copies), and a third strongest link to the third image $n_3$. A normalization with respect to the largest cluster (i.e. the cluster which includes the most copies) may be used to model this aspect. In this example, the largest cluster $C_1$ includes nine copies $c_{11}$-$c_{19}$. Therefore, a normalization of the keyword $k_3$ with respect to the images $n_1$-$n_3$ is obtained by multiplying the first rank component $\Gamma_n(k_3)$ with the respective number of occurrences in each cluster $C_1$-$C_3$ divided by nine. Of course, the general expression becomes:

$$\Gamma_n(k_j) = \frac{\sum_i k_{i,j}}{|C_n|} \cdot \frac{|C_n|}{|C_{max}|} = \frac{\sum_i k_{i,j}}{|C_{max}|}$$

where $|C_{max}|$ is the largest number of keywords in a cluster for any image that includes the relevant keyword $k_j$, for instance $k_3$.

The first rank component $\Gamma$ is made more usable for automated processing if it is also normalized, such that the highest first rank component $\Gamma$ for a particular keyword is equal to 1. This is accomplished by dividing the expression above with the following denominator:

$$\frac{\left(\sum_i k_{i,j}\right) \max, k_j}{|C_{max}|} \text{ where } \left(\sum_i k_{i,j}\right) \max, k_j$$

denotes the number of occurrences of the keyword $k_j$ in the cluster, which includes most occurrences of this keyword $k_j$. For instance $$\left(\sum_i k_{i,3}\right) \max, k_3$$

is equal to 3 in the present example, since the keyword $k_3$ occurs most times in the second cluster $C_2$, namely three times.

Hence, the first rank component $\Gamma_n(k_j)$ for an image n with respect to keyword $k_j$ is preferably modelled by the simplified expression:

$$\Gamma_n(k_j) = \frac{\sum_i k_{i,j}}{\left(\sum_i k_{i,j}\right) \max, k_j} \quad \text{where} \quad \sum_i k_{i,j}$$

represents the sum of all occurrences of the keyword $k_j$ in the cluster $C_n$ and $$\left(\sum_i k_{i,j}\right) \max, k_j$$

is the number of occurrences of the keyword $k_j$ in the cluster, which includes most occurrences of this keyword $k_j$.

However, in order to the improve the search performance in a database containing indexed elements referring to the digitized entities, it is preferable to build an inverted index on keywords, such that a set of first rank components F is instead expressed for each keyword $k_j$. Thus, according to a preferred embodiment of the invention, the format of the first rank component is $k_j:\{\Gamma_n\}$. Consequently, the keyword $k_3$ in the example above obtains the following set of first rank components:

$k_3: \{\Gamma_2=1; \Gamma_1=\frac{2}{3}; \Gamma_3=\frac{1}{3}\}$

The first rank component $\Gamma_n(k_j)$ itself constitutes a fair reflection of the relevancy of a keyword $k_j$ with respect to the image n. However, a more accurate figure can be obtained by combining the first rank component $\pi_n(k_j)$ with a proposed second rank component $\pi_n(k_j)$, which will be described below.

Figures 3, 4:
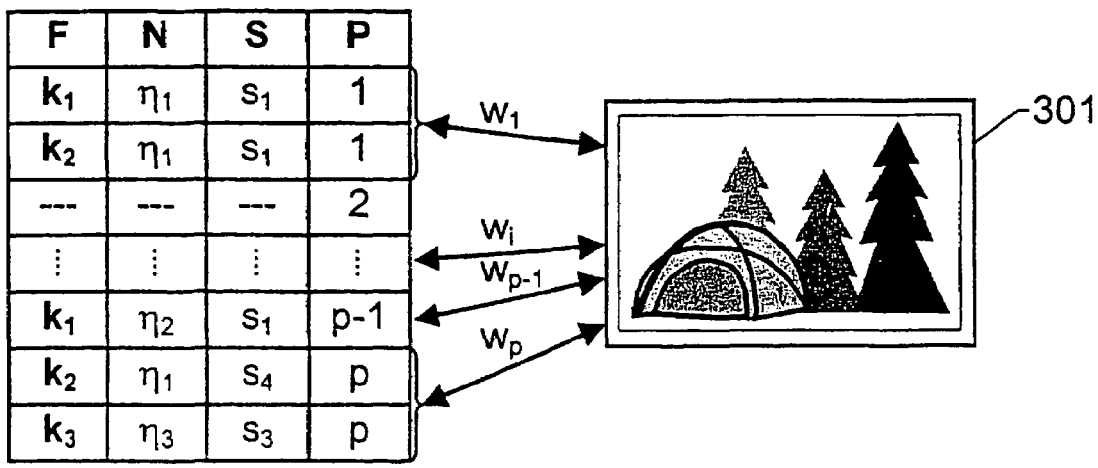
FIG. 3 illustrates the generation of a second rank component in the proposed rank parameter according to an embodiment of the invention, FIG. 4 demonstrates an exemplary structure of a search result according to an embodiment of the invention.

FIG. 3 illustrates how the second rank component $\pi_n(k_j)$ may be generated according to an embodiment of the invention.

A digitized entity, e.g. an image 301, is presumed to be associated with distinctive features $k_1$, $k_2$ and $k_3$, for instance in the form of keywords, which are found at various positions P in a descriptive field F. Each distinctive feature $k_1$-$k_3$ is estimated to have a relevance with respect to the digitized entity 301 that depends on the position P in the descriptive field F in which it is found. A weight factor $w_1$-$w_p$ for each position 1-p in the descriptive field F reflects this. In the illustrated example, a first distinctive feature $k_1$ and a second distinctive feature $k_2$ are located in a position 1 in the descriptive field F. Both the distinctive feature $k_1$ and the distinctive feature $k_2$ occur a number $\eta_1$ times in this position. There are no distinctive features in a second position 2. However, various distinctive features may be located in following positions 3 to p−2 (not shown). The field F contains $\eta_2$ copies of the first distinctive feature $k_1$ in a position p−1 and $\eta_1$ copies of the second distinctive feature $k_2$ respective $\eta_3$ copies of a third distinctive feature $k_3$ in a position p.

Hence, depending on the position 1-p in which a certain distinctive feature $k_1$-$k_3$ is found, the distinctive feature $k_1$-$k_3$ is allocated a particular weight factor $w_1$-$w_p$. Furthermore, a relevancy parameter $s_1$-$s_4$ is determined for every distinctive feature $k_1$-$k_3$, which depends on how many times $\eta_1$-$\eta_3$ the distinctive feature $k_1$-$k_3$ occurs in a position 1-p relative a total number of distinctive features in this position 1-p.

Thus, both the first distinctive feature $k_1$ and the second distinctive feature $k_2$ obtain the same relevancy parameter $s_1$, which can be calculated as $s_1=\eta_1/(2\eta_1)=\frac{1}{2}$ in the position 1. This parameter $s_1$ is further weighted with a weight factor $w_1$ in respect of the digitized entity 301. The same calculations are performed for all the positions 2-p to obtain corresponding relevancy parameters $s_1$-$s_4$ for these positions.

Alternatively, the relevancy parameter $s_P$ can be determined as $$s_P(k_{j \neq i}) = 1 - \gamma \sum_i k_i, \text{ where } \gamma \sum_i k_i$$

resents a "penalty" that decreases the relevancy for a distinctive feature $k_j$ in a position P, for each distinctive feature in this position, which is different from the distinctive feature $k_j$. Naturally, other alternative formulas for determining the relevancy parameter $s_P$ are also conceivable.

Nevertheless, a combined measure is determined, which fully captures the relationship between distinctive features $k_j$ and digitized entities n. The expression:

$$\Pi(n, k_j) = \frac{\sqrt{\sum_{i=1}^{p} (w_i \cdot s_{i,j})^2}}{\sqrt{\sum_{i=1}^{p} w_i^2}}$$

constitutes a reflection of the relevance of a distinctive feature $k_j$ with respect to a particular digitized entity n. The variable $w_i$ denotes the weight factor for a position i and the variable $s_{i,j}$ denotes the relevancy parameter for a distinctive feature $k_j$ in the position i.

In analogy with the first rank component $\Gamma$, its is preferable also to normalize and build an inverted index on keywords. The second rank component $\pi$ is thus given a format $k_j:\{\pi_n\}$, where the first component $\pi_n$ for a particular distinctive feature $k_i$ is always equal to 1.

Table 1 below shows an explicit example over weight factors $w_i$ for a certain positions P in a descriptive field F related to an image.

TABLE 1

| Position (P) | Field (F) | Weight factor ($w_p$) |
| --- | --- | --- |
| 1 | pageSite | 50 |
| 2 | pageDir | 40 |
| 3 | pageName | 50 |
| 4 | pageTitle | 80 |
| 5 | pageDescription | 90 |
| 6 | pageKeywords | 90 |
| 7 | pageText | 20 |
| 8 | imageSite | 50 |
| 9 | imageDir | 60 |

TABLE 1-continued

| Position (P) | Field (F) | Weight factor ($w_P$) |
|---|---|---|
| 10 | imageName | 100 |
| 11 | imageAlt | 100 |
| 12 | imageAnchor | 80 |
| 13 | imageCenterCaption | 90 |
| 14 | imageCellCaption | 90 |
| 15 | imageParagraphCaption | 90 |

According to an embodiment of the invention, the second rank component $\pi_n(k_j)$ is used as an alternative to the first rank component $\Gamma_n(k_j)$. The second rank component $\pi_n(k_j)$ is namely also a per se good descriptor of the relevancy of a keyword $k_j$ with respect to the image n.

In a preferred embodiment of the invention, however, the first rank component $\Gamma$ and the second rank component $\pi$ are merged into a combined rank parameter $\Delta$ according to the expression:

$$\Delta = \sqrt{\frac{(\alpha\Gamma)^2 + (\beta\Pi)^2}{\alpha^2 + \beta^2}}$$

where $\alpha$ is a first merge factor and $\beta$ is a second merge factor. For instance, $0 \leq \alpha \leq 1$ and $0 \leq \beta \leq 1$. However, any other range of the merge factors $\alpha;\beta$ are likewise conceivable.

Finally and in similarity with the first and second rank components $\Gamma$ and $\pi$ respectively, it is preferable to normalize and build an inverted index on keywords, such that it obtains a format $k_j:\{\Delta_n\}$, where the first component $\Delta_n$ for a particular distinctive feature $k_j$ is always equal to 1.

When all, or at least a sufficiently large portion, of the digitized entities in the data collection have been related to at least one distinctive feature and a corresponding rank component/parameter ($\Gamma$, $\pi$ or $\Delta$), an index database is created, which also at least includes a field for identifying the respective digitized entity and a field containing one or more locators that indicate where the digitized entity can be retrieved. Moreover, it is preferable if the index database contains an intuitive representation of the digitized entity. If the digitized entity is an image, a thumbnail picture constitutes a suitable representation. If, however, the digitized entity is an audio file or multimedia file, other representations might prove more useful, for instance in the form of logotypes or similar symbols.

FIG. 4 demonstrates an exemplary structure of a search result according to an embodiment of the invention. The search result is listed in a table 400, where a first column E contains the identity $ID_1$-$ID_m$ of the entities that matched the search criteria sufficiently well. A second column K contains an inventory of ranked distinctive features $\Delta(k_1)$-$\Delta(k_{23})$ for each digitized entity. A third column R includes a characterizing representation (or an illustrative element) $r_1$-$r_m$ of the entity and a fourth column L contains at least one locator $l_1$-$l_m$ to a corresponding "full version" of the entity. In case the data collection is an internetwork the locator $l_1$-$l_m$ is typically a URL (Universal Resource Locator). However, any other type of address is equally well conceivable.

Naturally, the search result structure may also include arbitrary additional fields. A reduced set of fields may then be presented to a user. It could, for instance, be sufficient to display only the representation $r_1$-$r_m$ and/or a limited number of the distinctive features, with or without their respective ranking.

Figure 5:
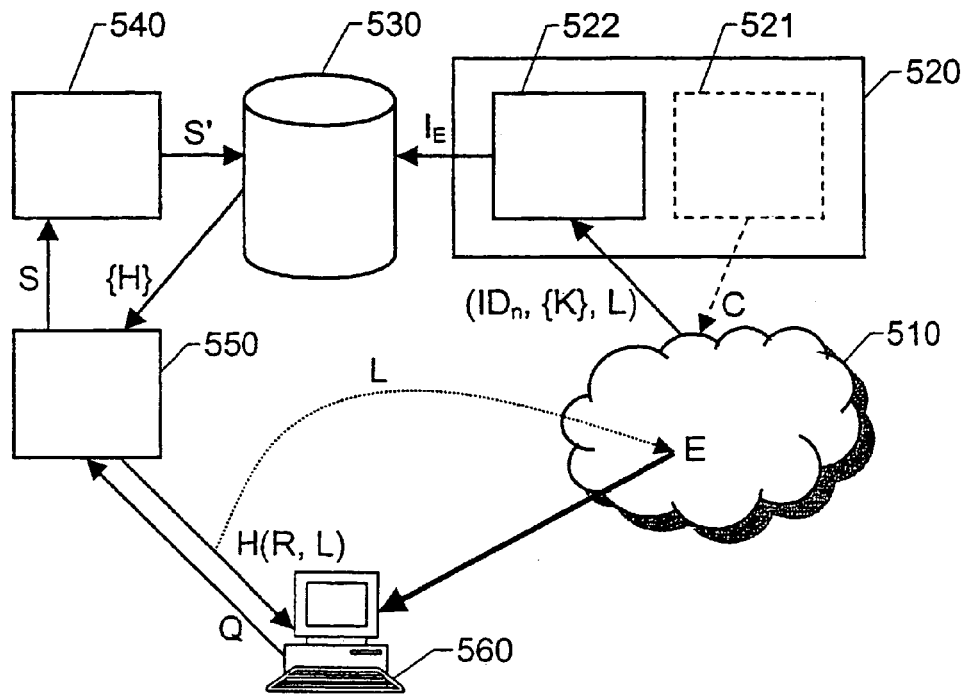
FIG. 5 shows a block diagram over a server/client system according to an embodiment of the invention.

FIG. 5 shows a block diagram over a server/client system according to an embodiment of the invention, through which data may be both indexed, searched and retrieved. Digitized entities are stored in a large and rather unstructured data collection 510, for instance the Internet. An indexing input device 520 gathers information $ID_n$, $\{K\}$; L from the data collection 510 with respect to digitized entities contained therein. The information $ID_n$, $\{K\}$; L includes at least an identity field $ID_n$ that uniquely defines the digitized entity E, a set of distinctive features $\{K\}$ and a locator L. Additional data, such as file size and file type may also be gathered by the indexing input device 520. It is irrelevant exactly how the information $ID_n$, $\{K\}$; L is entered into the indexing input device 520. However, according to a preferred embodiment of the invention, an automatic data collector 521, for instance in the form of an web crawler, in the indexing input device 520 regularly accumulates C the information $ID_n$, $\{K\}$; L as soon as possible after addition of new items or after updating of already stored items. An index generator 522 in the indexing input device 520 creates index information $I_E$ on basis of the information $ID_n$, $\{K\}$; L according to the methods disclosed above. An index database 530 stores the index information $I_E$ in a searchable format, which is at least adapted to the operation of a search engine 540.

One or more user client terminals 560 are offered a search interface towards the index information $I_E$ in the index database 530 via a user client interface 550. A user may thus enter a query phrase Q, for instance, orally via a voice recognition interface or by typing, via a user client terminal 560. Preferably, however not necessarily, the user client interface 550 re-formulates the query Q into a search directive, e.g. in the form of a search string S, which is adopted to the working principle of the search engine 540. The search engine 540 receives the search directive S and performs a corresponding search S' in the index database 530.

Any records in the database 530 that match the search directives S sufficiently well are sorted out and returned as a hit list $\{H\}$ of digitized entities E to the user client interface 550. If necessary, the user client interface 550 re-formats the hit list $\{H\}$ into a search result having a structure H(R,L), which is better suited for human perception and/or adapted to the user client terminal 560. The hit list $\{H\}$ preferably has the general structure shown in FIG. 4. However, the search result H(R,L) presented via the user client terminal 560 may have any other structure that is found appropriate for the specific application. If the query phrase Q comprises more than one search term (or distinctive feature), the search result H(R,L) has proven to demonstrate a desirable format when each search term in the hit list $\{H\}$ is normalized before presentation to the user, such that a first combined rank parameter $\Delta_n$ for each search term is equal to 1. For instance, a hit list $\{H\}$ resulting from a search query Q="ferarri 550" is normalized such that the first combined rank parameter $\Delta_n=1$ both with respect to "ferarri" and with respect to "550". Any additional combined rank parameters $\Delta_m$ for the respective search terms may, of course, have arbitrary lower value depending on the result of the search.

The signature associated with each unique digitized entity makes it possible eliminate any duplicate copies of digitized entities in the search result H(R,L). Such elimination produces a search result H(R,L) of very high quality and relevance.

A minimum requirement is that the data sent to the user client terminal 560 includes a characteristic representation R of the digitized entities in the hit list $\{H\}$ and corresponding locators L, e.g. URL, for indicating at least one storage location in the data collection 510. The latter gives the user at least a theoretical possibility to retrieve full versions of the digitized entities. In practice, however, the retrieval may be restricted in various ways, for instance by means of copyright protection and therefore require the purchase of the relevant rights.

The units 510-560 may either be physically separated from each other or be co-located in arbitrary combination.

Figure 6:
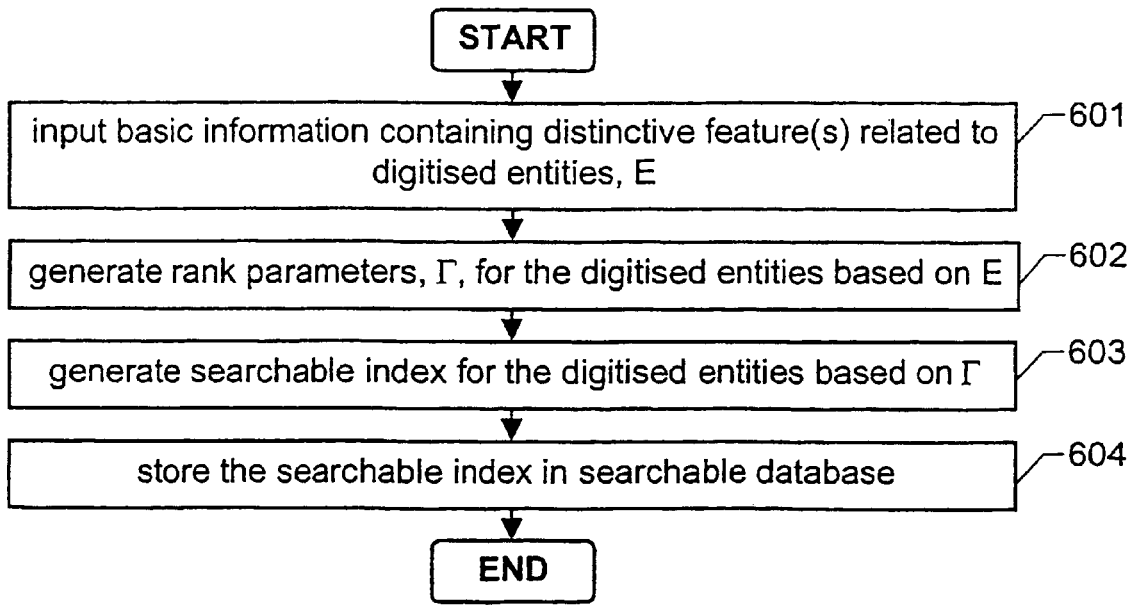
FIG. 6 illustrates, by means of a flow diagram, an embodiment of the method according to the invention.

In order to sum up, a method of generating a searchable index for digitized entities according to an embodiment of the invention will now be described with reference to a flow diagram in the FIG. 6.

A first step 601 involves input of basic information that contains one or more distinctive features being related to digitized entities in a data collection. A following step 602 creates rank parameters for each of the digitized entities on the basis of the input information. Then, a step 603 generates a searchable index for the rank parameters and finally, the searchable index is stored in a searchable database in a step 604.

All of the process steps, as well as any sub-sequence of steps, described with reference to the FIG. 6 above may be controlled by means of a computer program being directly loadable into the internal memory of a computer, which includes appropriate software for controlling the necessary steps when the program is run on a computer. The computer program can likewise be recorded onto a computer readable medium.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of indexing digitized non-text entities in a data collection comprising:

retrieving basic information pertaining to at least one distinctive feature and at least one locator for each digitized non-text entity in a set of entities from the data collection using an indexing input device, using an index generator of the indexing input device to generate searchable index information related to the entities in the set on the basis of the basic information and storing the index information in an index database of a storage device, wherein the index information for a particular digitized non-text entity is generated by the index generator on the basis of at least one rank parameter derived from the basic information, the at least one rank parameter being indicative of a degree of relevance for at least one distinctive feature with respect to the digitized non-text entity, wherein the at least one rank parameter is based on a first rank component that is generated by ranking individual distinctive features related to the digitized non-text entity on the basis of a relative occurrence of the individual distinctive features with respect to multiple copies of the digitized non-text entity in the data collection, and wherein the at least one rank parameter is further based on a second rank component that is generated by ranking at least one individual distinctive feature related to the digitized non-text entity on the basis of a position of the least one individual distinctive feature in a descriptive field associated with the digitized non-text entity, wherein the generating of the rank parameter involves a combination of the first rank component with the second rank component, and wherein the first rank component and the second rank component are combined according to the expression:

$$\sqrt{\frac{(\alpha \Gamma)^2 + (\beta \Pi)^2}{\alpha^2 + \beta^2}}$$

where $\Gamma$ represents the first rank component, $\pi$ represents the second rank component, $\alpha$ represents a first merge factor and $\beta$ represents a second merge factor.

2. The method according to claim 1, wherein generating the first rank component involves the following steps, with respect to a particular distinctive feature, for the digitized non-text entity:

grouping multiple copies of the digitized non-text entities in clusters, each cluster containing multiple copies of the same digitized non-text entity, counting a total number of occurrences of the particular distinctive feature in each cluster, and calculating a ratio between the total number of occurrences of the particular distinctive feature in the cluster for the digitized non-text entity and the total number of occurrences of the particular distinctive feature in a cluster which includes a largest number of the particular distinctive feature.

3. The method according to claim 1, wherein the second rank component is generated on the basis of a particular weight factor being linked to each position in the descriptive field, the weight factors reflecting a distinctive feature's significance with respect to its position in the descriptive field.

4. The method according to claim 3, wherein the second rank component is generated on the basis of a relevancy parameter reflecting a distinctive feature's significance in relation to other distinctive features in a particular position in the descriptive field.

5. The method according to claim 1, wherein the digitized non-text entities include at least one of the file types: an image, a video sequence and an audio sequence.

6. The method according to claim 5, wherein at least one of the digitized non-text entities constitutes a sampled and digitized representation of an analog signal.

7. The method according to claim 5, wherein at least one of the digitized non-text entities constitutes a computer generated entity.

8. The method according to claim 1, wherein the distinctive feature comprises a keyword.

9. A computer readable storage medium, having a program recorded thereon, where the program is to make a computer perform the steps of claim 1.

* * * * *

UNITED STATES PATENT AND TRADEMARK OFFICE
CERTIFICATE OF CORRECTION

PATENT NO. : 7,516,129 B2  Page 1 of 1
APPLICATION NO. : 10/471105
DATED : April 7, 2009
INVENTOR(S) : Risberg et al.

It is certified that error appears in the above-identified patent and that said Letters Patent is hereby corrected as shown below:

Title page,
Item (86), PCT No. "PCT/SE02/00452" should read --PCT/SE02/00462--.

Column 5,
Line 35, "F" should read --Γ--.

Signed and Sealed this

Twenty-third Day of June, 2009

JOHN DOLL
*Acting Director of the United States Patent and Trademark Office*